United States Patent
Inagaki et al.

(10) Patent No.: US 9,240,591 B2
(45) Date of Patent: Jan. 19, 2016

(54) ACTIVE MATERIAL FOR BATTERY, NONAQUEOUS ELECTROLYTE BATTERY, AND BATTERY PACK

(71) Applicant: KABUSHIKI KAISHA TOSHIBA, Minato-ku (JP)

(72) Inventors: Hiroki Inagaki, Yokohama (JP); Yasuhiro Harada, Yokohama (JP); Yorikazu Yoshida, Yokohama (JP); Kazuki Ise, Fuchu (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 91 days.

(21) Appl. No.: 14/202,903

(22) Filed: Mar. 10, 2014

(65) Prior Publication Data
US 2014/0287285 A1 Sep. 25, 2014

(30) Foreign Application Priority Data

Mar. 25, 2013 (JP) ................................. 2013-062863
Mar. 3, 2014 (JP) ................................. 2014-040947

(51) Int. Cl.
| | |
|---|---|
| *H01M 4/485* | (2010.01) |
| *H01M 4/36* | (2006.01) |
| *H01M 10/0525* | (2010.01) |
| *H01M 4/04* | (2006.01) |
| *H01M 4/131* | (2010.01) |
| *H01M 4/1391* | (2010.01) |
| *H01M 10/052* | (2010.01) |
| *H01M 4/02* | (2006.01) |

(52) U.S. Cl.
CPC ............ *H01M 4/485* (2013.01); *H01M 4/0416* (2013.01); *H01M 4/0471* (2013.01); *H01M 4/131* (2013.01); *H01M 4/1391* (2013.01); *H01M 4/366* (2013.01); *H01M 10/0525* (2013.01); *H01M 10/052* (2013.01); *H01M 2004/021* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 4,736,380 | A | 4/1988 | Agoston |
| 2012/0052401 | A1 | 3/2012 | Goodenough et al. |
| 2013/0209863 | A1 | 8/2013 | Harada et al. |

FOREIGN PATENT DOCUMENTS

| | | |
|---|---|---|
| CN | 101901905 A | 12/2010 |
| CN | 102544466 A | 7/2012 |

(Continued)

OTHER PUBLICATIONS

C.M. Reich, et al., "Niobia Based Rutile Materials as SOFC Anodes", Fuel Cells No. 3-4, 2001, 7 pages.

Extended European Search Report issued Jun. 10, 2014 in Patent Application No. 14158614.9.

(Continued)

*Primary Examiner* — Carlos Barcena
*Assistant Examiner* — Wojciech Haske
(74) *Attorney, Agent, or Firm* — Oblon, McClelland, Maier & Neustadt, L.L.P.

(57) ABSTRACT

In general, according to one embodiment, the active material for a battery contains a niobium composite oxide represented by the formula: $Li_xM_{(1-y)}Nb_yNb_2O_{(7+\delta)}$. M represents at least one kind selected from the group consisting of Ti and Zr. X, y, and δ are numbers respectively satisfying the following: $0 \le x \le 6$, $0 \le y \le 1$, and $-1 \le \delta \le 1$). The pH of the active material for a battery is from 7.4 to 12.5.

12 Claims, 8 Drawing Sheets

(56) References Cited

FOREIGN PATENT DOCUMENTS

| EP | 0 244 054 A2 | 11/1987 |
|---|---|---|
| JP | 2010-287496 | 12/2010 |
| JP | 2012-99287 | 5/2012 |
| JP | 2013-37774 | 2/2013 |
| WO | WO 2012/016185 A2 | 2/2012 |

OTHER PUBLICATIONS

Office Action issued Aug. 27, 2015 in Korean Patent Application No. 10-2014-0029308 (with English translation).
Jian-Tao Han, et al., "New Anode Framework for Rechargeable Lithium Batteries", Chemistry of Materials, vol. 23, 2011, pp. 2027-2029.
Office Action mailed Nov. 2, 2015, in Chinese Patent Application 201410092375.5 (with Machine English Translation).

ACTIVE MATERIAL FOR BATTERY, NONAQUEOUS ELECTROLYTE BATTERY, AND BATTERY PACK

CROSS-REFERENCE TO RELATED APPLICATION

This application is based upon and claims the benefit of priority from the Japanese Patent Application No. 2013-062863, filed Mar. 25, 2013 and No. 2014-040947, filed Mar. 3, 2013 which are incorporated herein by reference.

FIELD

Embodiments described herein relate generally to an active material for a battery, a nonaqueous electrolyte battery, and a battery pack.

BACKGROUND

Recently, a nonaqueous electrolyte battery such as a lithium-ion secondary battery has been developed as a battery having a high energy density. The nonaqueous electrolyte battery is expected to be used as a power source for hybrid vehicles or electric cars. Further, it is expected to be used as an uninterruptible power supply for base stations for portable telephone, and the like. For this, the nonaqueous electrolyte battery is desired to have other performances such as rapid charge/discharge performances and long-term reliability. For example, a nonaqueous electrolyte battery enabling rapid charge/discharge not only remarkably shortens the charging time but also makes it possible to improve performances of the motive force of a hybrid vehicle and to efficiently recover the regenerative energy of them.

In order to enable rapid charge/discharge, it is necessary that electrons and lithium ions can migrate rapidly between the positive electrode and the negative electrode. When a battery using a carbon based material in the negative electrode repeats rapid charge/discharge, dendrite precipitation of metal lithium is occurred on the electrode. Dendrite causes internal short circuits, which can lead heat generation and fires.

In light of this, a battery using a metal composite oxide as a negative electrode active material in place of a carbonaceous material has been developed. Particularly, in a battery using a titanium oxide as the negative electrode active material, rapid charge/discharge can be performed stably. Such a battery also has a longer life than those using a carbonaceous material.

However, the titanium oxide has a higher (nobler) potential than the carbonaceous material relative to metal lithium. Further, the titanium oxide has a lower capacity per weight. Thus, a battery formed by using the titanium oxide has a problem such that the energy density is low.

The potential of the electrode using the titanium oxide is about 1.5 V based on metal lithium and is higher (nobler) than that of the negative electrode using the carbonaceous material. The potential of the titanium oxide is due to the redox reaction between $Ti^{3+}$ and $Ti^{4+}$ when lithium is electrochemically inserted and released. Therefore, it is limited electrochemically. Further, there is the fact that rapid charge/discharge of lithium ion can be stably performed at an electrode potential as high as about 1.5 V. Therefore, it is substantially difficult to drop the potential of the electrode to improve energy density.

As to the capacity of the battery per unit weight, the theoretical capacity of a lithium-titanium composite oxide such as $Li_4Ti_5O_{12}$ is about 175 mAh/g. On the other hand, the theoretical capacity of a general graphite type electrode material is 372 mAh/g. Therefore, the capacity density of the titanium oxide is significantly lower than that of the carbon type material. This is due to a reduction in substantial capacity because there are only a small number of lithium-adsorbing sites in the crystal structure and lithium tends to be stabilized in the structure.

In view of such circumstances, a new electrode material containing Ti and Nb has been examined. Such a material is expected to have high charge/discharge capacity. Particularly, the theoretical capacity of a composite oxide represented by $TiNb_2O_7$ exceeds 300 mAh/g. However, there is a problem such that, in such an oxide which reacts at a high potential like about 1.5 V vs $Li/Li^+$, any surface film is hard to be formed, and thus decomposition of an electrolyte solution on the electrode surface (that is, a side reaction) is easily continued.

DETAILED DESCRIPTION

In general, according to one embodiment, the active material for a battery contains a niobium composite oxide represented by the formula: $Li_xM_{(1-y)}Nb_yNb_2O_{(7+\delta)}$. M represents at least one kind selected from the group consisting of Ti and Zr. X, y, and δ are numbers respectively satisfying the following: $0 \leq x \leq 6$, $0 \leq y \leq 1$, and $-1 \leq \delta \leq 1$). The pH of the active material for a battery is from 7.4 to 12.5.

Hereinafter, the embodiments will be described with reference to the attached drawings.

First Embodiment

The active material for a battery according to the first embodiment contains the niobium composite oxide represented by the formula: $Li_xM_{(1-y)}Nb_yNb_2O_{(7+\delta)}$ (wherein M represents at least one kind selected from the group consisting of Ti and Zr, x, y, and δ are numbers respectively satisfying the following: $0 \leq x \leq 6$, $0 \leq y \leq 1$, and $-1 \leq \delta \leq 1$) and the pH is from 7.4 to 12.5.

The crystal structure of the niobium composite oxide will be explained with reference to FIGS. 1 and 2.

Figure 1:
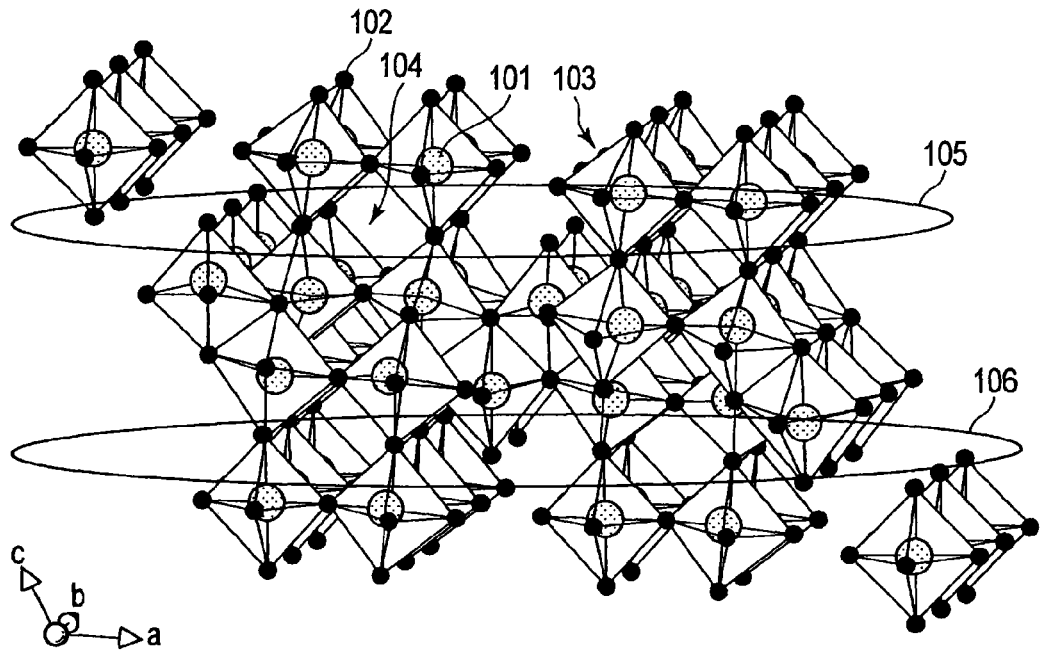
FIG. 1 is a pattern diagram showing a crystal structure of a niobium composite oxide ($TiNb_2O_7$) in an active material for a battery of a first embodiment.
Figure 2:
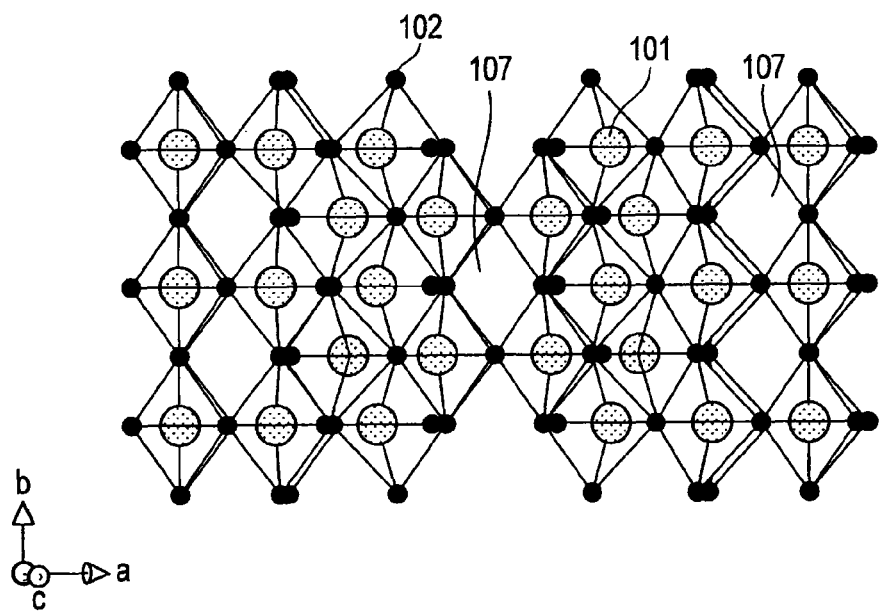
FIG. 2 is a pattern diagram showing the crystal structure of FIG. 1 from another direction.

As shown in FIG. 1, in the crystal structure of monoclinic niobium composite oxide ($TiNb_2O_7$), metal ions 101 and oxide ions 102 form skeletal structures 103. Nb and Ti ions are randomly located in a metal ion 101 at a Nb/Ti ratio of 2:1. The skeletal structures 103 are arranged three-dimensionally alternately, and a void 104 is formed between the skeletal structures 103. The void 104 serves as a host of lithium ion.

In FIG. 1, areas 105 and 106 are portions with two-dimensional channels in directions [100] and [010]. As shown in FIG. 2, in each region, in the crystal structure of monoclinic $TiNb_2O_7$, a void 107 is present in a direction [001]. The void 107 has a tunnel structure advantageous for the conduction of lithium ions and serves as a conduction path connecting the areas 105 and 106 in a [001] direction. Therefore, lithium ions can go back-and-forth between the areas 105 and 106 through the conduction path.

Thus, the monoclinic crystal structure has an equivalently large space into which lithium ions are inserted and has a structural stability. Further, the structure has two-dimensional channels enabling rapid diffusion of lithium ions and conduction paths connecting these channels in the direction [001]. Then, the lithium ions are inserted into and released from the insertion spaces effectively, and the insertion and release spaces for lithium ions are effectually increased. Therefore, the monoclinic crystal structure can provide a high capacity and high rate performance.

When lithium ions are inserted in the void 104, the metal ion 101 constituting the skeleton is reduced to a trivalent one, thereby maintaining electroneutrality of a crystal. In the monoclinic oxide represented by $TiNb_2O_7$, not only a Ti ion is reduced from tetravalent to trivalent but also an Nb ion is reduced from pentavalent to trivalent. For this, the number of reduced valences per active material weight is large. Therefore, the electroneutrality of the crystal can be maintained, even if many lithium ions are inserted. For this, the energy density of the oxide is high than that of a compound only containing a tetravalent cation, such as the titanium oxide. The theoretical capacity of the monoclinic oxide represented by $TiNb_2O_7$ is about 387 mAh/g and is more than twice the value of a titanium oxide having a spinel structure.

The monoclinic oxide represented by $TiNb_2O_7$ has about a lithium adsorbing potential of 1.5 V (vs. Li/Li$^+$). Therefore, a battery which is excellent in rate performance, is capable of stably repeating charge/discharge, and has high energy density can be provided by using the active material having a crystal structure represented by $TiNb_2O_7$.

As an example of M, y, and δ in the formula $M_{(1-y)}Nb_yNb_2O_{(7+\delta)}$, M represents Ti, y represents 0, and δ represents 0. In this case, the composition formula of the niobium composite oxide is $TiNb_2O_7$. As another example, M represents Ti or Zr at a ratio of 0.9 to 0.1, y represents 0, and δ represents 0. In this case, the composition formula of the niobium composite oxide is $Ti_{0.9}Zr_{0.1}Nb_2O_7$. Further, as another example, M represents Ti, y represents 0.1 and δ represents 0.05. In this case, the composition formula of the niobium composite oxide is $Ti_{0.9}Nb_{2.1}O_{7.05}$. As another example, M represents either Ti or Zr, y represents 1, and δ represents 0.5. In this case, the composition formula of the niobium composite oxide is $Nb_3O_{15/2}$, that is, $Nb_2O_5$.

The niobium composite oxide represented by the formula $Li_xM_{(1-y)}Nb_yNb_2O_{(7+\delta)}$ preferably has the crystal structure of the monoclinic oxide. More preferably, it has a symmetry of space group C2/m or P12/m1. It may be a crystal structure having atomic coordination described in Non Patent Literature 2.

It has been found that the solid acid site concentration of the niobium composite oxide represented by the formula $Li_xM_{(1-y)}Nb_yNb_2O_{(7+\delta)}$ is high. The electrolyte solution used for the nonaqueous electrolyte battery is easily decomposed at the solid acid site of the active material for a battery. This becomes a factor of a reduction in charge/discharge efficiency of the battery. As the result of decomposition, decomposition products such as lithium fluoride and lithium oxide are accumulated on the surface of the active material, and the resistance of the battery is increased. These matters cause a fall in performances of the battery, such as the lifespan performance and the high-current performance thereof.

When the pH of the active material for a battery of the first embodiment is set to a range of 7.4 to 12.5, the solid acid site concentration can be greatly reduced, and the first cycle charge/discharge efficiency can be dramatically improved. The pH value may be achieved by arranging carbonate ions on at least one part of the surface. Particularly, lithium carbonate is arranged on at least one part of the surface so that the first cycle charge/discharge efficiency can be dramatically improved, and excellent charge/discharge characteristics can be realized. The pH is preferably from 7.8 to 12.5, more preferably from 9.0 to 11.0.

In the present application, the pH of the active material for a battery means a value measured by extraction at normal temperature (JIS K5101-17-2:2004). Specifically, it is a pH value obtained by adding 1 g of the active material for a battery to 50 g of distilled water, vigorously shaking the resultant mixture for 1 minute, allowing it to stand for 5 minutes, and measuring the pH with a pH meter.

In this regard, the pH of the active material for a battery may vary according to the specific surface area. In other words, if the sizes of the same active materials for a battery when measured are different from each other, the specific surface areas change. As a result, they may exhibit a different pH. The active material for a battery according to the embodiment preferably shows the above pH as measured when the specific surface area is from 0.5 to 50 m$^2$/g. Further, the active material preferably shows the above pH as measured when the specific surface area is from 3 to 30 m$^2$/g. In this regard, when the specific surface area is out of the range of 0.5 to 50 m$^2$/g, or out of the range of 3 to 30 m$^2$/g, the active material may show a pH out of the above pH range.

The effect of the first embodiment can be obtained by arranging carbonate ions on one part of the surface. When the surface is covered with carbonate ions, a higher effect can be obtained. In the active material, the reactivity of the active material with the electrolyte solution is suppressed, and the first cycle charge/discharge efficiency is increased. Further, this contributes to large current characteristics and excellent charge/discharge cycle performance.

The niobium composite oxide represented by the formula: $Li_xM_{(1-y)}Nb_yNb_2O_{(7+\delta)}$ contained in the active material for a battery of the first embodiment is preferably granular.

The carbon content of the active material for a battery of the first embodiment is preferably from 0.01 to 3% by mass based on the total mass of the active material. More preferably, the carbon content of the active material for a battery of the first embodiment is from 0.01 to 1% by mass based on the total mass of the active material. When carbonate ions having a carbon concentration of 0.01% by mass or more are arranged, a sufficient effect can be obtained, a side reaction with an electrolyte solution can be decreased, and excessive formation of high resistance films can be suppressed. Even if carbonate ions on the surface become excessive, the effect of the first embodiment can be obtained. However, this leads to a decrease in capacity of the active material. In addition, the active material itself becomes a resistive component. Accordingly, the carbon concentration is set to preferably 3% by mass or less, more preferably 1% by mass or less.

The carbon content in the niobium composite oxide represented by the formula: $Li_xM_{(1-y)}Nb_yNb_2O_{(7+\delta)}$ can be quantified by the high frequency heating-infrared absorption method. For example, the titanium composite oxide taken out from the battery is dried at 150° C. for 12 hours, weighed and placed in a container, and measured with a measurement device (e.g., CS-444LS, manufactured by LECO Corporation).

The state of carbon can be determined with an electron probe micro analyzer (EPMA) which is applied to the cross section of the active material, for example, by line analysis or carbon mapping.

Alternatively, when carbonate ions $(CO_3^-)$ are arranged on at least one part of the surface of the niobium composite oxide represented by the formula $Li_xM_{(1-y)}Nb_yNb_2O_{(7+\delta)}$, the existence of carbonate ions $(CO_3^-)$ can be confirmed with Fourier transform infrared spectrophotometer (FT-IR). A peak from the carbonate ion $(CO_3^-)$ appears in the range of 1430±30, the range of 1500±30, or the range of 2350±30 $cm^{-1}$ in an infrared reflectance spectrum.

The niobium composite oxide can be taken out from a battery by a method described hereinafter. The battery is dismantled in the state of discharge, and then one of its electrodes (for example, negative electrode) is taken out and washed with methylethyl carbonate. The washed negative electrode layer is inactivated in water. The niobium composite oxide in the negative electrode layer is extracted with a centrifugal separator.

The active material for a battery according to the first embodiment can be used not only for a negative electrode but also for a positive electrode, excellent charge/discharge cycle performance can be obtained even in either case. That is, the charge/discharge cycle performance is an effect obtained by arranging carbonate ions on the surface. Even if the active material is used for the negative electrode or the positive electrode, the effect is not changed.

When the active material for a battery according to the embodiment is used for a positive electrode, the active material for a negative electrode as the counter electrode thereof may be a metallic lithium, a lithium alloy, or a carbonaceous material such as graphite or coke.

When the active material in the first embodiment is used as a positive electrode active material, the material may be used alone or together with a different active material. Examples of other active materials include lithium-titanium composite oxides having a spinel structure ($Li_4Ti_5O_{12}$, etc.), titanium composite oxides having an anatase-type, rutile-type, or monoclinic β-type structure (a-$TiO_2$, $TiO_2$(B) etc.), and iron composite sulfides (FeS and $FeS_2$ etc.). When the active material in the first embodiment is used as a positive electrode active material, the material may be used alone or together with a different active material. Examples of other active materials include lithium-titanium composite oxides having a spinel structure ($Li_4Ti_5O_{12}$ etc.), titanium composite oxides having an anatase-type, rutile-type, or monoclinic β-type structure (a-$TiO_2$, r-$TiO_2$, $TiO_2$(B) etc.), and iron composite sulfides (FeS and $FeS_2$ etc.).

When an electrode contains the different active material, the content may be measured as follows. The negative electrode active material taken out from the electrode is subjected to Transmission Electron Microscope-Energy Dispersive X-ray spectrometry (TEM-EDX), and the crystal structure of each particle is specified by a selected area diffraction method. A particle having a diffraction pattern belonging to a niobium composite oxide is selected so as to measure the carbon content. At this time, the region of carbon existing can be known with carbon mapping by EDX.

In the measurement with Fourier transform infrared spectrophotometer (FT-IR), the titanium composite oxide extracted in the same procedure is fixed onto a measuring tool, and then measured. For example, the measurement can be made under the following conditions, using the following apparatus:

Fourier transform type FTIR apparatus: FTS-60A (manufactured by BioRad Digilab Co.)
Light source: Special ceramic material
Detector: DTGS (Deuterium Tri-Glycine Sulfate)
Wavenumber resolving power: 4 $cm^{-1}$
Integration times: 256
Attached device: diffuse reflection measuring device (manufactured by PIKE Technologies Co.), aperture plate $CaF_2$
Reference: gold The particle of the niobium composite oxide represented by the formula $Li_xM_{(1-y)}Nb_yNb_2O_{(7+\delta)}$, that is, the primary particle preferably have an average particle diameter of 10 nm to 100 μm. When the average particle diameter of the primary particle is 10 nm or more, the oxide is easily handled in an industrial production. When the average particle diameter is 100 μm or less, lithium ions can be smoothly diffused in the solid of the niobium composite oxide.

Still more preferably, the average particle diameter is from 0.03 to 30 μm. When the average particle diameter is 0.03 μm or more, the oxide is easily handled in an industrial production. When the average particle diameter is 30 μm or less, the mass and the thickness of the electrode layer are easily made uniform in the process of an electrode, and further the surface smoothness of the layer is improved.

The specific surface area of the active material is preferably from 0.5 to 50 $m^2/g$. When the specific surface area is 0.5 $m^2/g$ or more, adsorbing and eliminating sites for lithium ions can be sufficiently secured. When the specific surface area is 50 $m^2/g$ or less, the particles are easily handled in an industrial production thereof. More preferably, the specific surface area is from 3 to 30 $m^2/g$.

(Production Process)

Subsequently, a process of producing the active material for a battery of the first embodiment will be explained.

The process comprises obtaining the niobium composite oxide represented by the formula: $Li_xM_{(1-y)}Nb_yNb_2O_{(7+\delta)}$ in accordance with a solid phase reaction process and arranging carbonate ions on the surface thereof.

First, the step of obtaining the niobium composite oxide represented by the formula: $Li_xM_{(1-y)}Nb_yNb_2O_{(7+\delta)}$ will be explained.

First, starting materials are mixed. As the starting materials, oxides optionally containing Ti, Nb, and Zr or salts are used. In the synthesis of $TiNb_2O_7$, oxides such as titanium dioxide and niobium pentoxide may be used as the starting materials. The salts used as the starting materials are preferably salts which decompose at relatively low temperatures to form oxides, like hydroxide salt, carbonate, and nitrate. Niobium hydroxide and zirconium hydroxide are appropriate.

Next, the resultant mixture is ground and blended as uniformly as possible. Then, the resultant mixture is sintered. The sintering can be performed at a temperature range from 900 to 1400° C. for a total of 1 hour to 100 hours.

The niobium composite oxide represented by the formula: $Li_xM_{(1-y)}Nb_yNb_2O_{(7+\delta)}$ can be obtained by the above steps.

It is acceptable that the lithium ions are inserted by the charging of the battery and remain, as irreversible capacity, in the active material. Alternatively, the active material may be synthesized as a composite oxide containing lithium by using a compound containing lithium like lithium carbonate as a starting material. Therefore, the active material may contain the monoclinic oxide phase represented by the formula: $Li_xM_{(1-y)}Nb_yNb_2O_{(7+\delta)}$.

Subsequently, the step of arranging carbonate ions at least one part of the surface of the niobium composite oxide represented by the formula: $Li_xM_{(1-y)}Nb_yNb_2O_{(7+\delta)}$ obtained in the above step will be explained.

In the step, the resultant niobium composite oxide is directly brought into contact with a carbonate ion containing solution or a hydroxide salt containing solution. For example, the treatment is performed as follows.

The niobium composite oxide represented by the formula: $Li_xM_{(1-y)}Nb_yNb_2O_{(7+\delta)}$, synthesized in the above step, was added to a predetermined amount of a solution of lithium carbonate (carbonate) or lithium hydroxide (hydroxide salt), which was stirred. The resultant solution is evaporated, for example, at 80° C. so that it is possible to obtain the niobium composite oxide represented by the formula: $Li_xM_{(1-y)}Nb_yNb_2O_{(7+\delta)}$ in which lithium carbonate or lithium hydroxide is arranged. The lithium hydroxide is converted into lithium carbonate in the air relatively immediately.

The niobium composite oxide in which carbonate ions are arranged is preferably subjected to calcination. The calcination may be performed in the air. The calcination conditions are as follows: temperature: 100 to 600° C., preferably 300 to 450° C., time: 10 minutes to 100 hours, preferably 1 hour to 24 hours. The calcination is performed under such conditions so that dense and adhesive carbonate ions can be attached.

Such treatment allows the niobium composite oxide represented by the formula: $Li_xM_{(1-y)}Nb_yNb_2O_{(7+\delta)}$ in which carbonate ions are arranged on at least one part of the surface to be obtained.

Hydroxide salt may be directly brought into contact with the carbon dioxide gas before and after the reheat treatment so as to be converted to carbonate ions.

According to the active material for a battery of the first embodiment produced as described above, excellent charge/discharge cycle performance is obtained.

(Measurement Method)

Hereinafter, various methods for measuring physical properties of the active material for a battery of the first embodiment will be described.

<Wide-Angle X-Ray Diffraction Measurement>

The crystal structure of the active material can be detected by the wide angle X-ray diffraction (WAXD).

The wide-angle X-ray diffraction measurement of the active material is performed as follows. First, a target sample is ground until the average particle diameter becomes about 5 μm or less or the particle size is selected with a sieve or the like. The average particle diameter can be determined by the laser diffractometry. In order to examine that the crystallinity of the sample is not influenced by the grinding process, it is confirmed that the half width of the main peak does not change before and after the grinding process.

A holder portion with a depth of 0.2 mm or more formed on a glass sample plate is filled with the ground sample, and the plane of the sample is smoothed using the glass plate. At this time, a further care must be taken to prevent the occurrence of cracks and voids caused by a lack of the sample to be filled. In order to properly determine the peak positions, the filling is carried out so as to prevent the generation of parts convexed or concaved from the standard level of the holder.

Then, the glass plate filled with the sample is placed in a wide-angle diffractometer and a diffraction pattern is obtained using Cu—Kα rays.

The influence of particle orientation may be caused depending on the particle shape of the sample. The position of a peak may be shifted or the intensity ratio may be changed. In this case, the same samples are put in a Lindeman glass capillary and measured using a rotating sample stage to examine the influence. Comparing the obtained X-ray charts, if differences (beyond errors of the device) are found in the intensity ratio of a specific surface, the measurement results using the rotating sample stage are applied to the scope of right of the present invention.

When the wide-angle X-ray diffraction measurement is performed on the active material contained in the electrode, it can be performed, for example, as follows. In order to analyze the crystal state of the active material, the active material is put into a state in which lithium ions are perfectly released from the active material. For example, when it is used as the negative electrode, the battery is put into a fully discharged state. However, there is the case where lithium ions remain even in a discharged state. In the wide-angle X-ray diffraction, it is difficult to detect the presence of Li, however, it may appear as a change of the lattice constant. When Li is considered to remain in the crystal structure, particular attention should be given to the results of analyses.

Next, the battery is disintegrated in a glove box filled with argon. Then, the electrode to be measured is washed with an appropriate solvent. For example, it is preferable to use ethylmethyl carbonate or the like. If the washing is insufficient, impurity phases such as lithium carbonate and lithium fluoride are mixed in due to the influence of lithium ions remaining in the electrode. In that case, it is preferable to use an airtight container in which the measurement is performed in an inert gas atmosphere. Subsequently, the washed electrode is cut into the same size as that of the area of the holder of the wide-angle diffractometer. The cut electrode is attached to the holder so as to be equal to the height of the standard level of the glass holder, followed by measurement. At this time, the position of the peak originated from the substrate is examined with regard to the kind of the metallic foil of the electrode substrate. The peak is subtracted from the measurement result. Further, the presence or absence of peaks originated from the ingredients such as a conductive agent and binder is examined. Similarly, the peaks can be subtracted from the measurement results. When the peak of the electrode substrate is overlapped on the peak of the active material, it is desired to separate the active material from the substrate prior to the measurement. This is necessary to accurately measure the peak intensity. The electrode is immersed in a solvent such as ethylmethyl carbonate and ultrasonic waves are applied thereto so that the electrode can be separated from the substrate. Thereafter, the electrode powder (including the active material, the conductive assistant, and the binder) which is recovered by volatilizing the solvent is put in a Lindeman glass capillary and subjected to the wide-angle X-ray diffraction measurement. Further, the electrode powder recovered in the same manner as described above may be subjected to various chemical analyses.

The results of the WAXD obtained in this manner are analyzed by the Rietveld method. In the Rietveld method, a diffraction pattern is calculated from a crystal structure model assumed in advance. Then, the diffraction pattern is fully fitted to actual values so as to improve the accuracy of parameters (for example, lattice constant, atomic coordination and occupation) relating to the crystal structure. Therefore, the characteristics of the crystal structure of the synthesized material can be investigated.

<Confirmation of Content of Element>

The content of the element can be measured by Inductively Coupled Plasma (ICP) emission spectrometry. The measurement of the elemental content by ICP emission spectrometry can be executed, for example, in the following manner. A battery is disassembled in a discharge state, and an electrode (e.g., a negative electrode) is taken out, followed by deactivation of the active material containing layer in water. Thereafter, the active material contained in the active material containing layer is extracted. The extraction treatment may be performed by removing a conductive agent and a binder in the active material containing layer by a heat treatment in air, for example. After transferring the extracted active material to a container, acid fusion or alkali fusion is performed to obtain a measurement solution. ICP emission spectroscopy of the measurement solution is conducted by using a measurement apparatus (e.g., SPS-1500V, manufactured by SII Nanotechnology Inc.) to measure the elemental content.

It is acceptable that the active material according to the embodiment contains 1000 mas ppm or less of inevitable impurities in production, in addition to the elements described in the present invention.

<Confirmation of Solid State>

The state of the crystal phase is confirmed by wide angle X-ray diffraction analysis so that it is possible to determine whether the added element M is substituted and dissolved. Specifically, the presence of impurity phases, changes in lattice constant (the ionic radius of the added element is reflected) or the like can be determined. However, when it is added in a small amount, some cases cannot be determined by these methods. At that time, the distribution state of the added element can be found by observation with the Transmission Electron Microscope (TEM) and measurement with the Electron Probe Micro Analyzer (EPMA). Accordingly, it is possible to determine whether the added element is uniformly distributed in a solid or segregated.

<Particle Diameter and BET Specific Surface Area>

The average particle diameter of the active material is not particularly limited and it may be changed according to desired battery characteristics. The BET specific surface area of the active material is not particularly limited and it is preferably 0.5 $m^2/g$ or more and less than 50 $m^2/g$. If the specific surface area is 0.5 $m^2/g$ or more, the necessary contact area with the nonaqueous electrolyte can be ensured. Thus, excellent discharge rate performance is easily obtained. Further, the charging time can be reduced. On the other hand, if the specific surface area is less than 50 $m^2/g$, the reactivity with the nonaqueous electrolyte does not become too high, and lifetime characteristics can be improved. In the process of producing an electrode, coating properties of a slurry containing the active material can be improved.

The specific surface area is measured using a method in which molecules whose adsorption occupied area is known are allowed to adsorb to the plane of powder particles at the temperature of liquid nitrogen to find the specific surface area of the sample from the amount of the adsorbed molecules. The most frequently used method is a BET method based on the low temperature/low humidity physical adsorption of an inert gas. The BET method is a famous theory as a calculation method of the specific surface area in which the Langmuir theory as a monolayer adsorption theory is extended to multilayer adsorption. The specific surface area determined by the BET method is called "BET specific surface area".

Second Embodiment

A nonaqueous electrolyte battery according to the second embodiment will be described.

The nonaqueous electrolyte battery of the second embodiment includes a positive electrode, a negative electrode containing the active material for a battery of the first embodiment, and a nonaqueous electrolyte. The nonaqueous electrolyte battery of the second embodiment may include a case. In this case, the nonaqueous electrolyte battery comprises the case, the positive electrode housed in the case, the negative electrode which is spatially apart from the positive electrode in the case in such a manner that, for example, a separator is interposed between the electrodes, and the nonaqueous electrolyte filled in the case.

Figure 3:
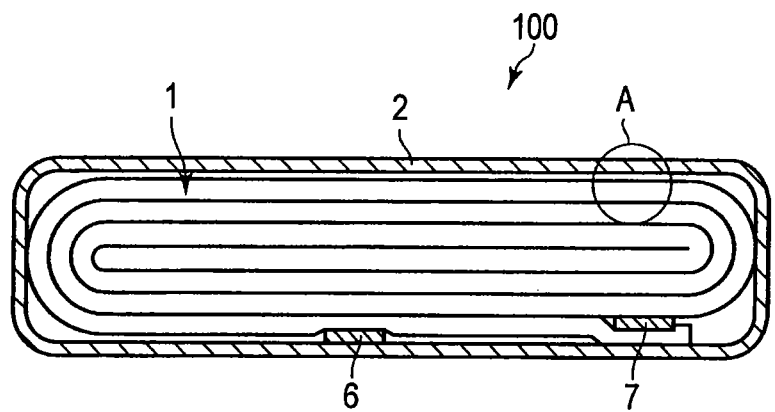
FIG. 3 is a cross-sectional view showing a flat type nonaqueous electrolyte battery according to a second embodiment.
Figure 4:
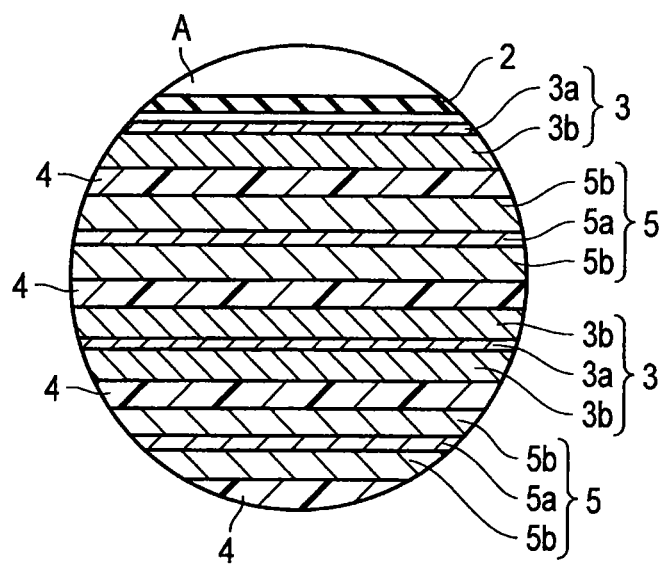
FIG. 4 is an enlarged sectional view of an A portion of FIG. 3.

An example of the nonaqueous electrolyte battery 100 according to the embodiment will be explained more in detail with reference to FIGS. 3 and 4. FIG. 3 is a cross-sectional view of the flat type nonaqueous electrolyte battery 100 with an case 2 formed of a laminate film. FIG. 4 is an enlarged sectional view of an A portion of FIG. 3. The figures are each a schematic view referred to in order to describe the battery. The shape and the sizes of each member therein, the ratio between some of the sizes, and others may be different from those in an actual form of the device; however, these may be appropriately changed with reference the following description and any known technique.

A flat wound electrode group 1 is housed in a baggy case 2 formed of a laminated film in which an aluminum foil is intervened between two resin layers. The flat wound electrode group 1 is formed by winding, into a spiral form, a laminate wherein a negative electrode 3, a separator 4, a positive electrode 5 and another separator 4 are laminated so as to be positioned in this order from the outside, and then press-forming the wound laminate. As illustrated in FIG. 4, the outmost moiety of the negative electrode 3 has a structure wherein a negative electrode layer 3b is formed on the inside surface of a negative electrode current collector 3a. The other moieties of the negative electrode 3 each have a structure wherein negative electrode layers 3b are formed on both surfaces of the negative electrode current collector 3a, respectively. An active material in the negative electrode layer 3b contains the active material for a battery according to the first embodiment. The positive electrode 5 has a structure wherein positive electrode layers 5b are formed on both surfaces of a positive electrode current collector 5a, respectively.

Near the outer circumferential end of the wound electrode group 1, a negative electrode terminal 6 is connected electrically to the negative electrode current collector 3a of the outermost moiety of the negative electrode 3, and a positive electrode terminal 7 is connected electrically to the positive electrode current collector 5a of the inside positive electrode 5. The negative electrode terminal 6 and the positive electrode terminal 7 are extended outwardly from an opening part of the baggy case 2. For example, the liquid nonaqueous electrolyte is injected from the opening part of the baggy case 2. The wound electrode group 1 and the liquid nonaqueous electrolyte can be completely sealed by heat-sealing the opening part of the baggy case 2 across the negative electrode terminal 6 and the positive electrode terminal 7.

For the negative electrode terminal 6, use is made of, for example, a material having electroconductivity, and electrical stability when the material is at a potential of 1 V to 3 V relative to metallic lithium ions. A specific example thereof is aluminum, or an aluminum alloy containing Mg, Ti, Zn, Mn, Fe, Cu, Si or some other element. The raw material of the negative electrode terminal 6 is preferably equivalent to that of the negative electrode current collector 3a in order to decrease the contact resistance between the negative electrode terminal 6 and the negative electrode current collector 3a.

For the positive electrode terminal 7, use is made of, for example, a material having electroconductivity, and electrical stability when the material is at a potential of 3 to 4.25 V relative to metallic lithium ions. A specific example thereof is aluminum, or an aluminum alloy containing Mg, Ti, Zn, Mn, Fe, Cu, Si or some other element. The raw material of the positive electrode terminal 7 is preferably equivalent to that of the positive electrode current collector 5a in order to decrease the contact resistance between the positive electrode terminal 7 and the positive electrode current collector 5a.

The case 2, a negative electrode 3, a positive electrode 5, a separator 4, and the nonaqueous electrolyte, which are constituting members of the nonaqueous electrolyte battery 100, will be explained in detail.

1) Case

The case 2 is formed of a laminated film having a thickness of 0.5 mm or less. Alternatively, as the case, a metallic vessel having a thickness of 1.0 mm or less is used. The thickness of the metallic vessel is preferably 0.5 mm or less.

The shape of the case 2 can be selected from the flat type (thin type), rectangular type, cylindrical type, coin type, and button type. Examples of the case include a case for a small battery which is loaded into a portable electronic device or a case for a large battery which is loaded into a two- or four-wheeled vehicle depending on the size of the battery.

For the laminated film, use is made of a multi-layered film wherein a metal layer is interposed between any two of resin layers. The metal layer is preferably an aluminum foil or aluminum alloy foil in order to reduce the weight. The resin layers may each be, for example, a layer of a polymeric material such as polypropylene (PP), polyethylene (PE), nylon, or polyethylene terephthalate (PET). The laminated film can be formed into a shape of the case by heat sealing.

The metallic vessel may be made of aluminum, an aluminum alloy or the like. It is preferable that the aluminium alloy includes elements such as Mg, Zn, and Si. When transition metals such as Fe, Cu, Ni, and Cr are contained in the alloy, the content is preferably 100 mass ppm or less.

2) Negative Electrode

The negative electrode 3 comprises the current collector 3a, and the negative electrode layer 3b, which is formed on a single surface or each surface of the current collector 3a to contain an active material, a conductive agent and a binder.

The active material for a battery according to the first embodiment is used as the active material.

The nonaqueous electrolyte battery 100, into which the negative electrode 3 having the negative electrode layer 3b containing the active material is integrated, has a high-current property and an excellent charge/discharge cycle performance.

The conductive agent makes the current collecting performance of the active material high, and restrains the contact resistance between the active material and the current collector. Examples of the conductive agent include acetylene black, carbon black and graphite.

The binder makes it possible to bind the active material and the conductive agent to each other. Examples of the binder include polytetrafluoroethylene (PTFE), polyvinylidene fluoride (PVdF), fluorine-contained rubber, and styrene butadiene rubber.

In the negative electrode layer 3b, the active material, the conductive agent and the binder are preferably blended at a ratio of 70% to 96% by mass, a ratio of 2% to 28% by mass, and a ratio of 2% to 28% by mass, respectively. When the ratio of the conductive agent is set to 2% or more by mass, the current collecting performance of the negative electrode layer 3b is improved, so that the high-current characteristic of the nonaqueous electrolyte battery 100 can be improved. When the ratio of the binder is set to 2% or more by mass, the binding performance between the negative electrode layer 3b and the current collector 3a is made high, so that the cycle characteristic can be improved. When the ratios of the conductive agent and the binder are each set to 28% or less by mass, the capacity of the battery can be favorably made high.

The current collector 3a is preferably an aluminum foil piece, which is electrochemically stable in the potential range of 1 V or higher, or an aluminum alloy foil piece containing Mg, Ti, Zn, Mn, Fe, Cu, Si or some other element.

The negative electrode 3 is formed, for example, by suspending the active material, the conductive agent, and the binder into a widely usable solvent to prepare a slurry, painting the slurry onto the current collector 3a, drying the painted slurry, and then pressing the dried film. The negative electrode 3 may be formed by making the active material, the conductive agent and the binder into a pellet form, and forming the pellets into the negative electrode layer 3b onto the current collector 3a.

3) Positive Electrode

The positive electrode 5 comprises the current collector 5a, and the positive electrode layer 5b, which is formed on a single surface or each surface of the current collector 5a to contain an active material, a conductive agent and a binder. The active material may be, for example, an oxide or a polymer.

Usable examples of the oxide include manganese dioxide absorbing lithium ($MnO_2$), iron oxide, copper oxide, and nickel oxide, and lithium manganese composite oxides (e.g., $Li_xMn_2O_4$ or $Li_xMnO_2$), lithium nickel composite oxides (e.g., $Li_xNiO_2$), lithium cobalt composite oxides ($Li_xCoO_2$), lithium nickel cobalt composite oxides (e.g., $LiNi_{1-y}Co_yO_2$), lithium manganese cobalt composite oxides (e.g., $Li_xMn_yCo_{1-y}O_2$), lithium manganese nickel composite oxides having a spinel structure ($Li_xMn_{2-y}Ni_yO_4$), lithium phosphorus oxides having an olivine structure (e.g., $Li_xFePO_4$, $Li_xFe_{1-y}Mn_yPO_4$, and $Li_xCoPO_4$), iron sulfate ($Fe_2(SO_4)_3$), and vanadium oxides (e.g., $V_2O_5$). Here, x and y are preferably $0<x\leq1$ and $0\leq y\leq1$, respectively.

The polymer may be, for example, a conductive polymer such as polyaniline or polypyrrole, or a disulfide-based polymer material. The active material may be sulfur (S) or carbon fluoride.

Examples of a preferred active material include a lithium manganese composite oxide having a high positive electrode voltage ($Li_xMn_2O_4$), a lithium nickel composite oxide ($Li_xNiO_2$), a lithium cobalt composite oxide ($Li_xCoO_2$), a lithium nickel cobalt composite oxide ($Li_xNi_{1-y}Co_yO_2$), a lithium-manganese-nickel composite oxide having a spinel structure ($Li_xMn_{2-y}Ni_yO_4$), a lithium manganese cobalt composite oxide ($Li_xMn_yCo_{1-y}O_2$), and lithium iron phosphate ($Li_xFePO_4$). Here, x and y are preferably $0<x\leq1$ and $0\leq y\leq1$, respectively.

The active material is more preferably a lithium cobalt composite oxide or a lithium manganese composite oxide. The active material is high in ion conductivity; thus, in any combination of the active material with the above-mentioned negative electrode active material, the diffusion of lithium ions in the positive electrode active material does not become a rate-determining step easily. Therefore, the active material is excellent in adaptability to the lithium titanium composite oxide in the negative electrode active material.

The conductive agent makes the current collecting performance of the active material high, and restrains the contact resistance between the active material and the current collector. Examples of the conductive agent include carbonaceous materials such as acetylene black, carbon black and graphite.

The binder makes it possible to bind the active material and the conductive agent to each other. Examples of the binder include polytetrafluoroethylene (PTFE), polyvinylidene fluoride (PVdF), and fluorine-contained rubber.

In the positive electrode layer $5b$, the active material, the conductive agent and the binder are preferably blended at a ratio of 80% to 95% by mass, a ratio of 3% to 18% by mass, and a ratio of 2% to 17% by mass, respectively. When the ratio of the conductive agent is set to 3% or more by mass, the above-mentioned advantageous effects can be produced. When the ratio of the conductive agent is set to 18% or less by mass, the decomposition of the nonaqueous electrolyte on the surface of the conductive agent can be decreased when the battery is stored at high temperature. When the ratio of the binder is set to 2% or more by mass, a sufficient positive electrode strength can be obtained. When the ratio of the binder is set to 17% or less by mass, the blend ratio of the binder, which is an insulating material, in the positive electrode is decreased so that the internal resistance can be decreased.

The current collector is preferably, for example, an aluminum foil piece, or an aluminum alloy foil piece containing Mg, Ti, Zn, Mn, Fe, Cu, Si or some other element.

The positive electrode 5 is formed, for example, by suspending the active material, the conductive agent, and the binder into a widely usable solvent to prepare a slurry, painting the slurry onto the current collector $5a$, drying the painted slurry, and then pressing the dried film. The positive electrode 5 may be formed by making the active material, the conductive agent and the binder into a pellet form, and forming the pellets into the positive electrode layer $5b$ onto the current collector $5a$.

4) Nonaqueous Electrolyte

The nonaqueous electrolyte may be, for example, a liquid nonaqueous electrolyte prepared by dissolving an electrolyte into an organic solvent, or a gel-form nonaqueous electrolyte wherein a liquid electrolyte and a polymeric material are compounded with each other.

About the liquid nonaqueous electrolyte, an electrolyte is preferably dissolved into an organic solvent to give a concentration of 0.5 M to 2.5 M.

Examples of the electrolyte include lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluorometasulfonate ($LiCF_3SO_3$), a lithium salt of lithium bistrifluoromethylsulfonylimide [$LiN(CF_3SO_2)_2$], and mixtures of two or more thereof. The electrolyte is preferably an electrolyte which is not easily oxidized at a high potential, and is most preferably $LiPF_6$.

Examples of the organic solvent include cyclic carbonates such as propylene carbonate (PC), ethylene carbonate (EC) and vinylene carbonate; linear carbonates such as diethyl carbonate (DEC), dimethyl carbonate (DMC) and methyl ethyl carbonate (MEC); cyclic ethers such as tetrahydrofuran (THF), 2-methyltetrahydrofuran (2MeTHF) and dioxolane (DOX); linear ethers such as dimethoxyethane (DME) and diethoxyethane (DEE); g-butyrolactone (GBL); acetonitrile (AN); and sulfolane (SL). These organic solvents may be used alone or in the form of a mixture.

Examples of the polymeric material include polyvinylidene fluoride (PVdF), polyacrylonitrile (PAN), and polyethylene oxide (PEO).

The organic solvent is preferably a mixed solvent made of at least two selected from the group consisting of propylene carbonate (PC), ethylene carbonate (EC) and diethyl carbonate (DEC), or a mixed solvent containing g-butyrolactone (GBL). By use of the mixed solvent, a nonaqueous electrolyte battery excellent in high-temperature property can be obtained.

5) Separators

The separators 4 may each be, for example, a porous film containing polyethylene, polypropylene, cellulose or polyvinylidene fluoride (PVdF), or a nonwoven cloth made of a synthetic resin. The porous film is preferably made of polyethylene or polypropylene. Since the film is melted at a predetermined temperature to make it possible to block an electric current, safety can be improved.

According to the second embodiment, it can be provided a nonaqueous electrolyte battery having excellent charge/discharge cycle performance.

Third Embodiment

Subsequently, a battery pack according to the third embodiment will be explained in detail.

The battery pack according to the third embodiment has one or more of the nonaqueous electrolyte batteries (that is, unit cells) according to the second embodiment. When a plurality of unit cells are contained in the battery pack, each of the unit cells is electrically connected in series or in parallel, or in series and in parallel, and arranged.

A battery pack 200 will be specifically described with reference to FIGS. 5 and 6. In the battery pack 200 shown in FIG. 5, the nonaqueous electrolyte battery shown in FIG. 3 is used as unit cells 21.

The unit cells 21 are laminated onto each other in such a manner that their negative electrode terminals 6 and positive electrode terminals 7, which are extended to the outside, are arranged into the same direction, and further the unit cells 21 are fastened onto each other through an adhesive tape 22 to constitute a battery module 23. As illustrated in FIG. 6, these unit cells 21 are connected electrically to each other in series.

A printed wiring board 24 is arranged opposed to the side plane of the unit cells 21 where the negative electrode terminal 6 and the positive electrode terminal 7 are extended. A thermistor 25, a protective circuit 26, and an energizing terminal 27 to an external instrument are mounted on the printed wiring board 24 as shown in FIG. 6. An electric insulating plate (not shown) is attached to the surface of the printed wiring board 24 facing the battery module 23 to avoid unnecessary connection of the wiring of the battery module 23.

A positive electrode side lead 28 is connected to the positive electrode terminal 7 positioned as the lowest layer of the battery module 23, and the tip thereof is inserted into a positive electrode side connector 29 of the printed wiring board 24 to be connected electrically thereto. A negative electrode side lead 30 is connected to the negative electrode terminal 6 positioned as the highest layer of the battery module 23, and the tip thereof is inserted into a negative electrode side connector 31 of the printed wiring board 24 to be connected electrically thereto. The connectors 29 and 31 are connected to the protective circuit 26 through wirings 32 and 33 formed in the printed wiring board 24.

The thermistor 25 is used to detect the temperature of the unit cells 21. A signal of the detection is transmitted to the protective circuit 26. The protective circuit 26 can shut down a plus-side wiring 34a and a minus-side wiring 34b between the protective circuit 26 and the energizing terminals 27 energizing an external instrument under a predetermined condition. The predetermined condition is, for example, a time when the detected temperature of the thermistor 25 reaches a predetermined temperature or is higher than the temperature. The predetermined condition is also a time when an overcharge, an overdischarge or an overcurrent of the unit cells 21, or some other is detected. The overcharge detection may be performed on each of the unit cells 21 or the whole of the unit cells 21. When each of the unit cells 21 is detected, the cell voltage may be detected, or positive electrode or negative electrode potential may be detected. In the latter case, a lithium electrode used as a reference electrode is inserted into the individual unit cells 21. In the case of FIGS. 5 and 6, wirings 35 for voltage detection are connected to the unit cells 21 and detection signals are sent to the protective circuit 26 through the wirings 35.

Protective sheets 36 comprised of rubber or resin are arranged on three side planes of the battery module 23 except the side plane in which the positive electrode terminal 7 and the negative electrode terminal 6 are protruded.

The battery module 23 is housed in a holder 37 together with each of the protecting sheets 36 and the printed wiring board 24. In other words, the respective protecting sheets 36 are arranged onto the two inner side faces of the holder 37 along the holder long-side direction and one of two inner side faces of the holder 37 along the holder short-side direction, and further the printed wiring board 24 is arranged onto the other inner side face along the holder short-side direction. The battery module 23 is located in a space surrounded by the protecting sheets 36 and the printed wiring board 24. A cover 38 is fitted to the upper surface of the holder 37.

For the fixing of the battery module 23, a thermally shrinkable tape may be used instead of the adhesive tape 22. In this case, protecting sheets are arranged on two side faces of the battery module, respectively, and the thermally shrinkable tape is wound around the battery module, and then the tape is thermally shrunken to bind the battery modules to each other.

Figure 5:
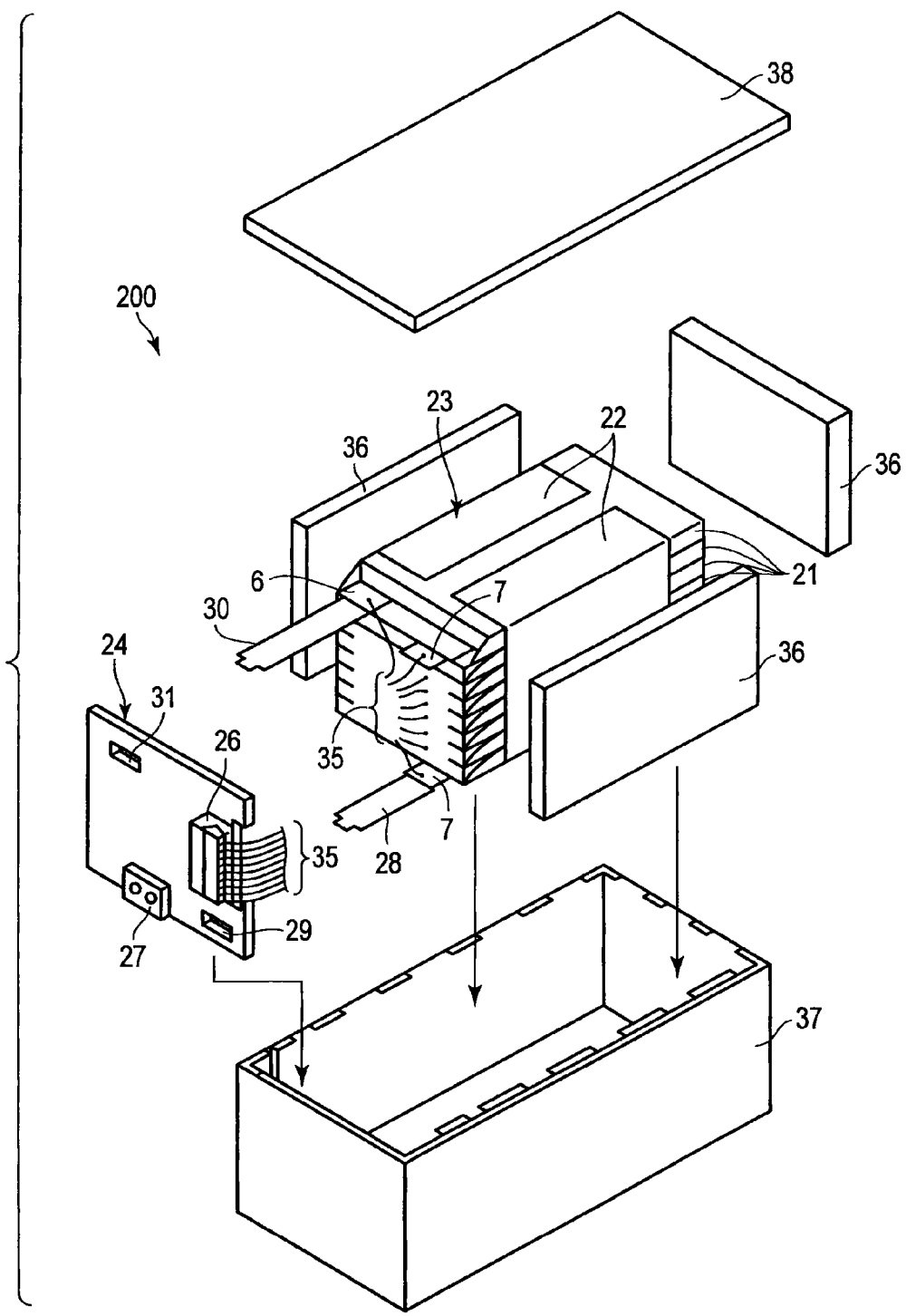
FIG. 5 is an exploded perspective view showing a battery pack according to a third embodiment.
Figure 6:
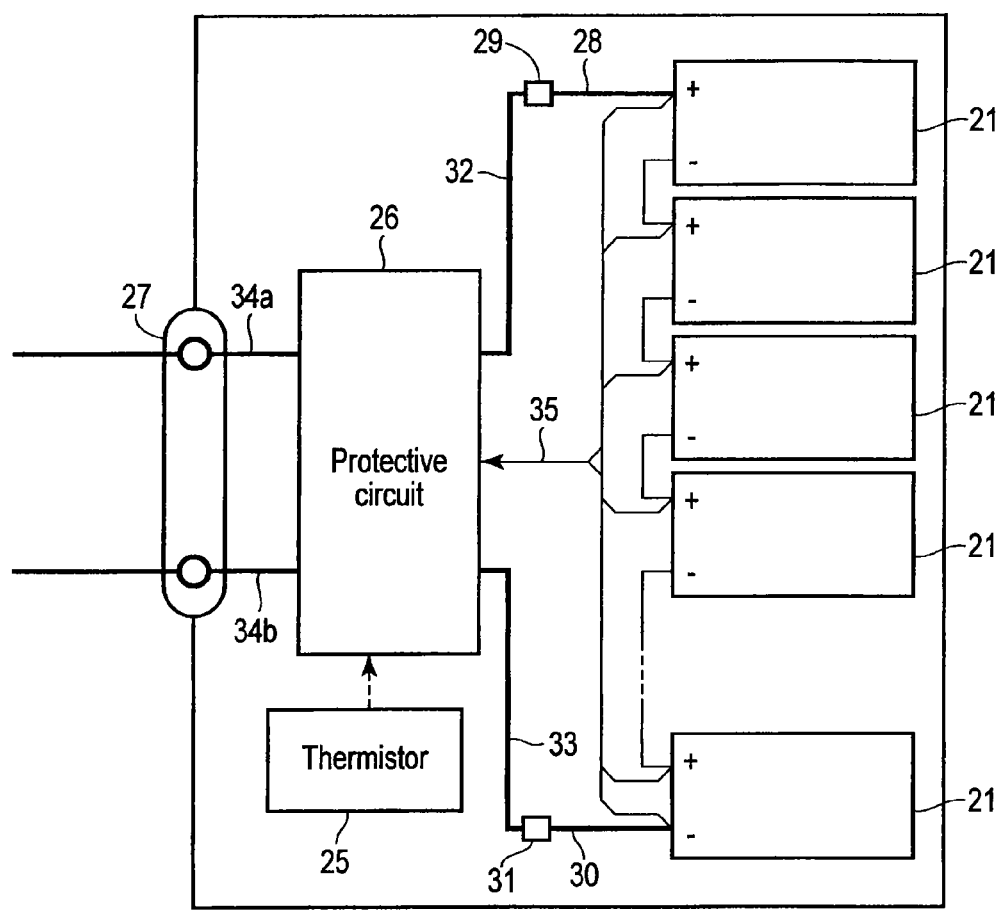
FIG. 6 is a block diagram showing the electric circuit of the battery pack of FIG. 5.
Figure 7:
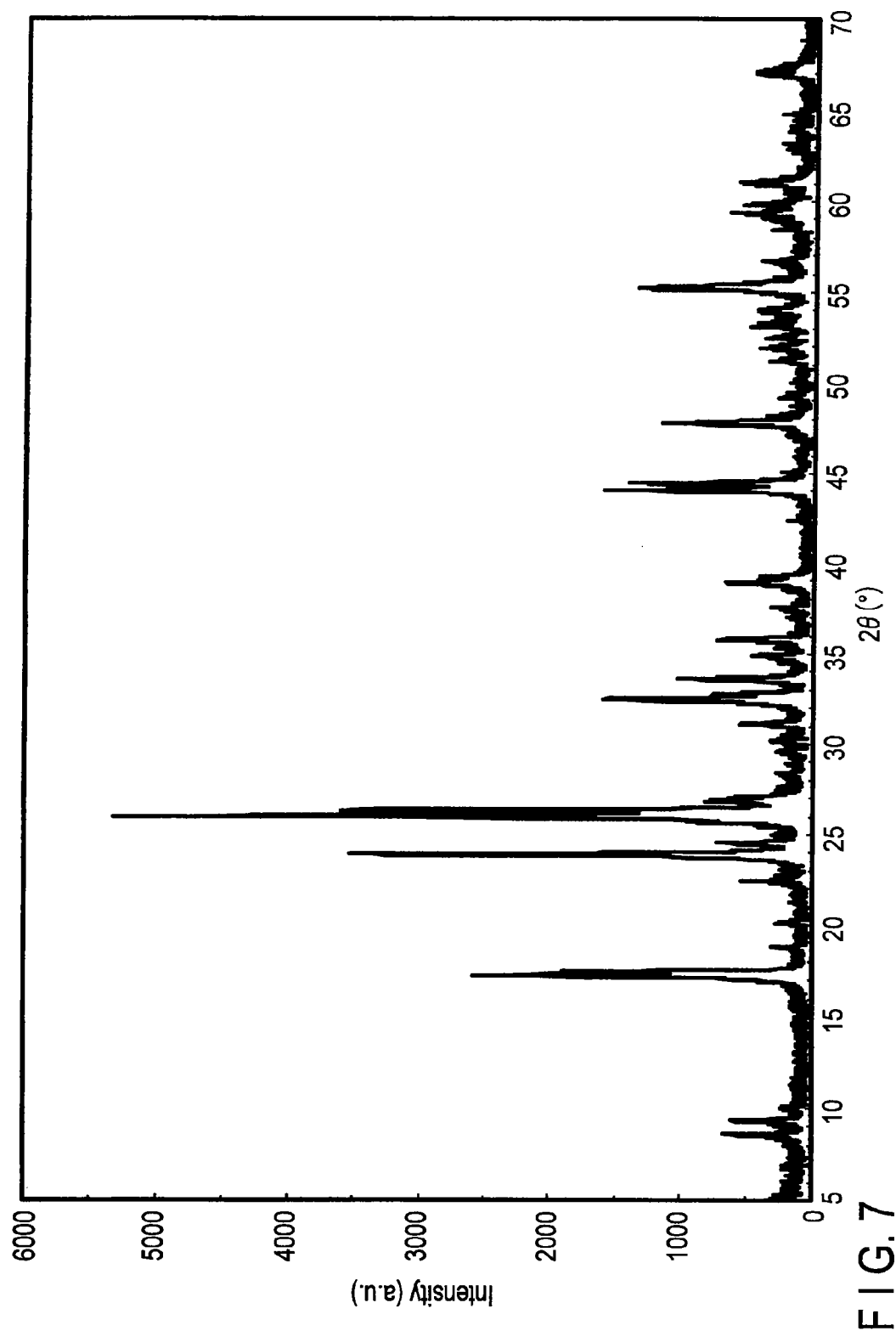
FIG. 7 is an X-ray diffraction pattern of the niobium composite oxide ($TiNb_2O_7$) in Example 1.

In FIGS. 5 and 6, the form in which the unit cells 21 are connected in series is shown. However, in order to increase the battery capacity, the cells may be connected in parallel. Alternatively, the cells may be formed by combining series connection and parallel connection. The assembled battery pack can be connected in series or in parallel.

According to the third embodiment, the nonaqueous electrolyte battery having excellent charge/discharge cycle performance in the second embodiment is included so that a battery pack having excellent charge/discharge cycle performance can be provided.

The form of the battery pack may be appropriately changed in accordance with the usage thereof. The battery pack is preferably used for an article exhibiting an excellent charge/discharge cycle performance when a large current is taken out therefrom. Specifically, the pack is used for, for example, a power source of a digital camera, a hybrid electric two- to four-wheeled vehicle, an electric two- to four-wheeled vehicle, an assisting bicycle, or some other vehicle. In particular, the battery pack of the embodiment wherein a nonaqueous electrolyte battery excellent in high-temperature property is used is preferably used for a vehicle.

Fourth Embodiment

A vehicle according to the fourth embodiment comprises the battery pack according to the third embodiment. Examples of the vehicle referred to herein include hybrid electric two- to four-wheeled vehicles, electric two- to four-wheeled vehicles, and assisting bicycles.

An example of the fourth embodiment includes a hybrid type vehicle using a running power source which is produced by combination of an internal combustion engine and an electromotor drivable by a battery. For the driving power of any vehicle, a driving power for widely-extendable rotation number and torque is required depending on the running conditions. In general, the torque and the rotation number which exhibit ideal energy efficiency are restricted in the internal combustion engines. Thus, under other torques and the rotation numbers, the energy efficiency is lowered. Hybrid type vehicles each have a characteristic that its internal combustion engine is driven under optimum conditions to generate electric power and further its wheels are driven by a highly efficient electromotor, or the dynamic power of its internal combustion engine and that of its electromotor are combined with each other to drive the wheels, whereby the energy efficiency of the whole of the vehicle can be improved. Moreover, when the speed of the vehicle decreases, the kinetic energy of the vehicle is converted so as to be regenerated as electric power, whereby the mileage thereof can be greatly increased from that of ordinary vehicles drivable by their internal combustion engine alone.

Hybrid vehicles can be roughly classified into three types in accordance with the combination of their internal combustion engine with their electromotor.

The first type is a hybrid vehicle which is generally called a series hybrid car. All of the dynamic power of an internal combustion engine is once converted to an electric power through a power source. This electric power is stored in a battery pack through an inverter. As this battery pack, the battery pack according to the third embodiment can be used. The electric power of the battery pack is supplied through the inverter to an electromotor. The electromotor drives wheels. This system is a system wherein a power source is hybridized with an electric vehicle. Its internal combustion engine can be driven under a driving condition for high efficiency, and further kinetic energy can be converted into electric power. However, the wheels are driven by only the electromotor, so that a high-power electromotor is required as the electromotor. Additionally, the battery pack is required to have a relatively large capacity. The rated capacity of the battery pack is desirably set into the range of 5 to 50 Ah. The capacity is more desirably in the range of 10 to 20 Ah. The rated capacity referred to herein means the capacity of the battery pack when the pack is discharged at a rate of 0.2 C.

The second type is a hybrid vehicle which is generally called a parallel hybrid car. The hybrid vehicle has an electromotor which functions also as a power source. An internal combustion engine mainly drives wheels. As the case may be, a part of the dynamic force thereof is applied to the electromotor to be converted to an electric power. By use of the electric power, a battery pack is charged. At the time of the start or acceleration of the vehicle, when a large load is applied to the internal combustion engine, driving force is assisted by the electromotor. The base of the vehicle is an ordinary vehicle, and the present system is a system wherein a variation in the load onto the internal combustion engine is made small to attain a high efficiency, and the conversion of kinetic energy to electric power and others are together conducted. The wheels are driven mainly by the internal combustion engine, so that the output power of the electromotor can be decided at will by the percentage of a necessary assist. Even if an electromotor and battery pack having a relatively small size are used, the system can be configured. The rated capacity of the battery pack may be in the range of 1 to 20 Ah. The capacity is more desirably in the range of 5 to 10 Ah.

The third type is a hybrid vehicle which is generally called a series parallel hybrid car. This hybrid vehicle is a type of combining a series hybrid with a parallel hybrid. It includes a dynamic force dividing mechanism. The mechanism divides the output power of an internal combustion engine into a power for generating electric power and a power for driving wheels. This type makes it possible to control load onto the engine minuter than the parallel type to make the energy efficiency higher.

The rated capacity of the battery pack is desirably set into the range of 1 to 20 Ah. The capacity is more desirably in the range of 5 to 10 Ah.

The nominal voltage of the battery pack mounted on each of the three type hybrid vehicles is desirably in the range of 200 to 600 V.

In general, each of the battery packs is preferably arranged in a space which has a temperature that is not easily affected by a change in the temperature of the outside air and does not easily receive any impact when the vehicle collides or undergoes some other accident. For example, in a sedan, the battery pack may be arranged inside a trunk room behind a rear sheet. The battery pack may be arranged under or behind the sheet. When the mass of the battery is large, it is preferred to arrange the battery under the sheet or the other sheet or below the floor in order to make the gravity center of the vehicle low.

According to the fourth embodiment, when the battery pack excellent in cycle characteristics according to the third embodiment is included, a vehicle having excellent performance can be provided.

The embodiment of the present invention has been hereinabove explained. However, this embodiment is presented as an example, and is not intended to limit the scope of the invention. These new embodiments can be embodied in various other forms, and various kinds of omissions, replacements, and changes can be made without deviating from the gist of the invention. These embodiments and the modifications thereof are included in the scope and the gist of the invention, and are included in the invention described in the claims and the scope equivalent thereto.

EXAMPLE

Example 1

Synthesis of Niobium Composite Oxide

Titanium dioxide ($TiO_2$) having an anatase structure was mixed with niobium pentoxide ($Nb_2O_5$). The mixture was sintered at 1100° C. for 24 hours to obtain a niobium composite oxide of the composition formula $TiNb_2O_7$ (sample A1).

The fact that the resultant substance was a niobium composite oxide represented by the composition formula: $TiNb_2O_7$ was confirmed by the wide angle X-ray diffraction method described below. The BET specific surface area of the substance was 10.2 m$^2$/g and the pH was 6.9.

Next, 100 g of the niobium composite oxide (sample A1) of the composition formula: $TiNb_2O_7$ was added to 100 g of water containing 3 g of lithium hydroxide dissolved therein. The mixture was left alone in a desiccator at 70° C. while stirring it to evaporate the moisture. Thereafter, the resultant product was heated in air at 400° C. for 3 hours to obtain a sample B1. The specific surface area of the sample B1 was 9.6 m$^2$/g and the pH was 8.7.

<Wide Angle X-Ray Diffraction Method>

The resultant titanium composite oxide was filled into a standard glass holder having a diameter of 25 mm, and then the oxide was measured by a wide angle X-ray diffraction method. As a result, an X-ray diffraction pattern shown in FIG. 10 was obtained. From this diffraction pattern, it was confirmed that a main substance constituting the resultant titanium composite oxide was a monoclinic niobium composite oxide represented by the composition formula: $TiNb_2O_7$ belonging to 39-1407 according to JCPDS (Joint Committee on Powder Diffraction Standards). The devices and conditions used for the measurement are shown as follows:

(1) X-ray generator: RU-200R, manufactured by Rigaku Corporation (Rotating anti-cathode type)
X-ray source: CuKα rays
Curved crystal monochromator (using graphite)
Power: 50 kV, 200 mA
(2) Goniometer: 2155S2 type, manufactured by Rigaku Corporation
Slit system: 1°-1°-0.15 mm-0.45 mm
Detector: Scintillation counter
(3) Count recorder: RINT1400 type, manufactured by Rigaku Corporation
(4) Scanning manner: 2θ/θ continuous scanning
(5) Qualitative analysis
Measurement range (2θ) 5 to 100°
Scanning speed: 2°/min
Step width (2θ) 0.02°

<Carbon Content>

The carbon content of the resultant titanium composite oxide (sample B1) was measured by the infrared absorption method. As a result, it was confirmed that the content was be 0.12% by mass.

<Production of Electrode>

A slurry was prepared by adding 90% by mass of powder of the titanium composite oxide (sample B1) obtained as an active material, 5% by mass of acetylene black as a conductive agent, and 5% by mass of polyvinylidene fluoride (PVdF) to N-methylpyrrolidone (NMP) and mixing. The slurry was applied on both surfaces of a current collector made from an aluminum foil having a thickness of 12 μm, followed by drying. Thereafter, a negative electrode having an electrode density of 2.8 g/cm$^3$ was obtained by pressing.

<Preparation of Liquid Nonaqueous Electrolyte>

Ethylene carbonate (EC) and diethyl carbonate (DEC) were mixed at a volume ratio of 1:2 to obtain a mixed solvent. $LiPF_6$ as an electrolyte was at a concentration of 1M at a concentration of 1M in the mixed solvent to prepare a liquid nonaqueous electrolyte.

<Production of Beaker Cells>

The produced electrode was used as a working electrode. A beaker cell in which lithium metal was used as a counter electrode and a reference electrode was produced. The liquid nonaqueous electrolyte was injected to complete a beaker cell of Example 1.

Comparative Example 1

In the production method described in Example 1, as the active material, the sample A1 was used in place of the sample B1 to produce a beaker cell of Comparative example 1.

Examples 2 to 7 and Comparative Example 2

In the production method described in Example 1, the amount of lithium hydroxide of a lithium hydroxide solution was changed to produce various samples ($TiNb_2O_7$) (samples C1 to I1). Specifically, the amount of the lithium hydroxide to be added to 100 g of water was as follows: 0.5 g for the sample C1, 1 g for the sample D1, 2 g for the sample B1, 4 g for the sample F1, 5 g for the sample G1, 10 g for the sample H1, and 20 g for the sample I1.

The resultant substance was measured by the wide angle X-ray diffraction method in the same manner as Example 1. As a result, it was identified that the sample was a monoclinic niobium composite oxide (space group: C/2m) belonging to No. 39-1407 according to the JCPDS card, represented by the formula: $Li_xM_{(1-y)}Nb_yNb_2O_{(7+\delta)}$.

The carbon content and pH of the samples C1 to I1 were measured in the same manner as Example 1. These results are shown in Table 1.

A beaker cell was produced in the same manner as Example 1 using any of the samples C1 to I1 as the active material (respectively, Examples 2 to 7 and Comparative example 2).

Example 8

In the production method described in Example 1, a lithium carbonate solution prepared by dissolving 4.6 g of lithium carbonate in 100 g of water was used in place of the lithium hydroxide solution to produce a sample J1 ($TiNb_2O_7$).

The resultant substance was measured by the wide angle X-ray diffraction method in the same manner as Example 1. As a result, it was identified that the sample was a monoclinic niobium composite oxide (space group: C/2m) belonging to No. 39-1407 according to the JCPDS card, represented by the formula: $Li_xM_{(1-y)}Nb_yNb_2O_{(7+\delta)}$.

The specific surface area of the sample J1 was 9.7 m$^2$/g and the pH was 8.5.

A beaker cell was produced in the same manner as Example 1 using the sample J1 as the active material (Example 8).

Example 9

Titanium dioxide having an anatase structure ($TiO_2$), niobium pentoxide ($Nb_2O_5$), and zirconium dioxide ($ZrO_2$) were mixed. The mixture was sintered at 1100° C. for 24 hours to obtain a niobium composite oxide ($Ti_{0.9}Zr_{0.1}Nb_2O_7$) (sample A2). The particle size was adjusted by dry-milling using zirconia balls. The pH of the substance was 6.9.

Next, 100 g of the niobium composite oxides (sample A2) of the composition formula: $Ti_{0.8}Zr_{0.2}Nb_2O_7$ was added to 100 g of water containing 3 g of lithium hydroxide dissolved therein. The mixture was left alone in a desiccator at 70° C. while stirring it to evaporate the moisture. Thereafter, the resultant product was heated in air at 400° C. for 3 hours to obtain a sample B2. The pH of the sample B2 was 8.6.

The sample was measured by the wide angle X-ray diffraction method in the same manner as Example 1. As a result, it was confirmed that the sample was a monoclinic niobium composite oxide (space group: C/2 m) belonging to No. 39-1407 according to the JCPDS card, represented by the formula: $Li_xM_{(1-y)}Nb_yNb_2O_{(7+\delta)}$.

The carbon content of the obtained titanium oxide was measured by the infrared absorption method. As a result, it was confirmed that the carbon content contained in the sample B2 was 0.12% by mass.

A beaker cell was produced in the same manner as Example 1 using the sample B2 as the active material (Example 9).

Comparative Example 3

A beaker cell was produced in the same manner as Example 1 using the sample A2 as the active material (Comparative example 3).

Example 10

Titanium dioxide ($TiO_2$) having an anatase structure and niobium pentoxide ($Nb_2O_5$) were mixed. The mixture was sintered at 1100° C. for 24 hours to produce a niobium composite oxide ($Ti_{0.9}Nb_{2.1}O_{7.05}$) (sample A3). The particle size was adjusted by dry-milling using zirconia balls. The pH of the substance was 7.0.

Next, 100 g of the niobium composite oxides (sample A3) of the composition formula: $Ti_{0.9}Nb_{2.1}O_{7.05}$ was added to 100 g of water containing 3 g of lithium hydroxide dissolved therein. The mixture was left alone in a desiccator at 70° C. while stirring it to evaporate the moisture. Thereafter, the resultant product was heated in air at 400° C. for 3 hours to obtain a sample B3. The pH of the sample B3 was 9.0.

The sample was measured by the wide angle X-ray diffraction method in the same manner as Example 1. As a result, it was confirmed that the sample was a monoclinic niobium composite oxide (space group: C/2 m) belonging to No. 39-1407 according to the JCPDS card, represented by the formula: $Li_xM_{(1-y)}Nb_yNb_2O_{(7+\delta)}$.

The carbon content of the obtained titanium oxide was measured by the infrared absorption method. As a result, it was confirmed that the carbon content contained in the sample B2 was 0.13 by mass.

A beaker cell was produced in the same manner as Example 1 using the sample B3 as the active material (Example 10).

Comparative Example 4

A beaker cell was produced in the same manner as Example 1 using the sample A3 as the active material (Comparative example 4).

Example 11

Niobium hydroxide ($Nb(OH)_5$) was sintered at 1100° C. for 24 hours to obtain a niobium oxide (M-$Nb_2O_5$) (sample A4). Further, the dry-milling of the resulting product was carried out using zirconia balls. The pH of the substance was 7.1.

Next, 100 g of the niobium composite oxides (sample A4) of the composition of M-$Nb_2O_5$ was added to 100 g of water containing 3 g of lithium hydroxide dissolved therein. The mixture was left alone in a desiccator at 70° C. while stirring it to evaporate the moisture. Thereafter, the resultant product was heated in air at 400° C. for 3 hours to obtain a sample B4. The pH of the sample B4 was 9.8.

The sample was measured by the wide angle X-ray diffraction method in the same manner as Example 1. As a result, it was identified that the sample was a monoclinic niobium oxide (space group: P12/m1) belonging to No. 27-1313 according to the JCPDS card, represented by the formula: $Li_xM_{(1-y)}Nb_yNb_2O_{(7+\delta)}$.

The carbon content of the obtained titanium oxide was measured by the infrared absorption method. As a result, it was confirmed that the carbon content contained in the sample B4 was 0.19% by mass.

A beaker cell was produced in the same manner as Example 1 using the sample B4 as the active material (Example 11).

Comparative Example 5

A beaker cell was produced in the same manner as Example 1 using the sample A4 as the active material (Comparative example 5).

Comparative Examples 6 and 7

Lithium carbonate ($Li_2CO_3$) and titanium oxide ($TiO_2$) having an anatase structure were mixed. The mixture was sintered at 850° C. for 24 hours to obtain a spinel type titanium composite oxide (sample A5) of the composition formula: $Li_4Ti_5O_{12}$.

The fact that the resultant substance was a spinel type titanium composite oxide was confirmed by the wide angle X-ray diffraction method in the same manner as Example 1. The pH of the substance was 11.0.

Next, 100 g of the spinel type titanium composite oxide (sample A5) was added to 100 g of water containing 3 g of lithium hydroxide dissolved therein. The mixture was left alone in a desiccator at 70° C. while stirring it to evaporate the moisture. Thereafter, the resultant product was heated in air at 400° C. for 3 hours to obtain a sample B5. The pH of the sample B5 was 11.2.

The carbon content of the obtained titanium oxide was measured by the infrared absorption method. As a result, it was confirmed that the carbon content contained in the sample B5 was 0.62% by mass.

A beaker cell was produced in the same manner as Example 1 using the sample A5 as the active material (Comparative example 6). Further, a beaker cell was produced in the same manner as Example 1 using the sample B5 as the active material (Comparative example 7).

(Measurement of Carbon Content by High Frequency Heating-Infrared Absorption Method)

The carbon content in titanium oxides and titanium composite oxides obtained in Examples 1 to 11 and Comparative examples 1 to 6 were measured by the high frequency heating-infrared absorption method. The results are shown in Table 1 below.

(Infrared Diffuse Reflectance Measurement)

The titanium oxides and the titanium composite oxides obtained in Examples 1 to 11 and Comparative examples 1 to 6 were subjected to infrared diffuse reflectance measurement with Fourier transform infrared spectrophotometer (FT-IR).

Figure 8:
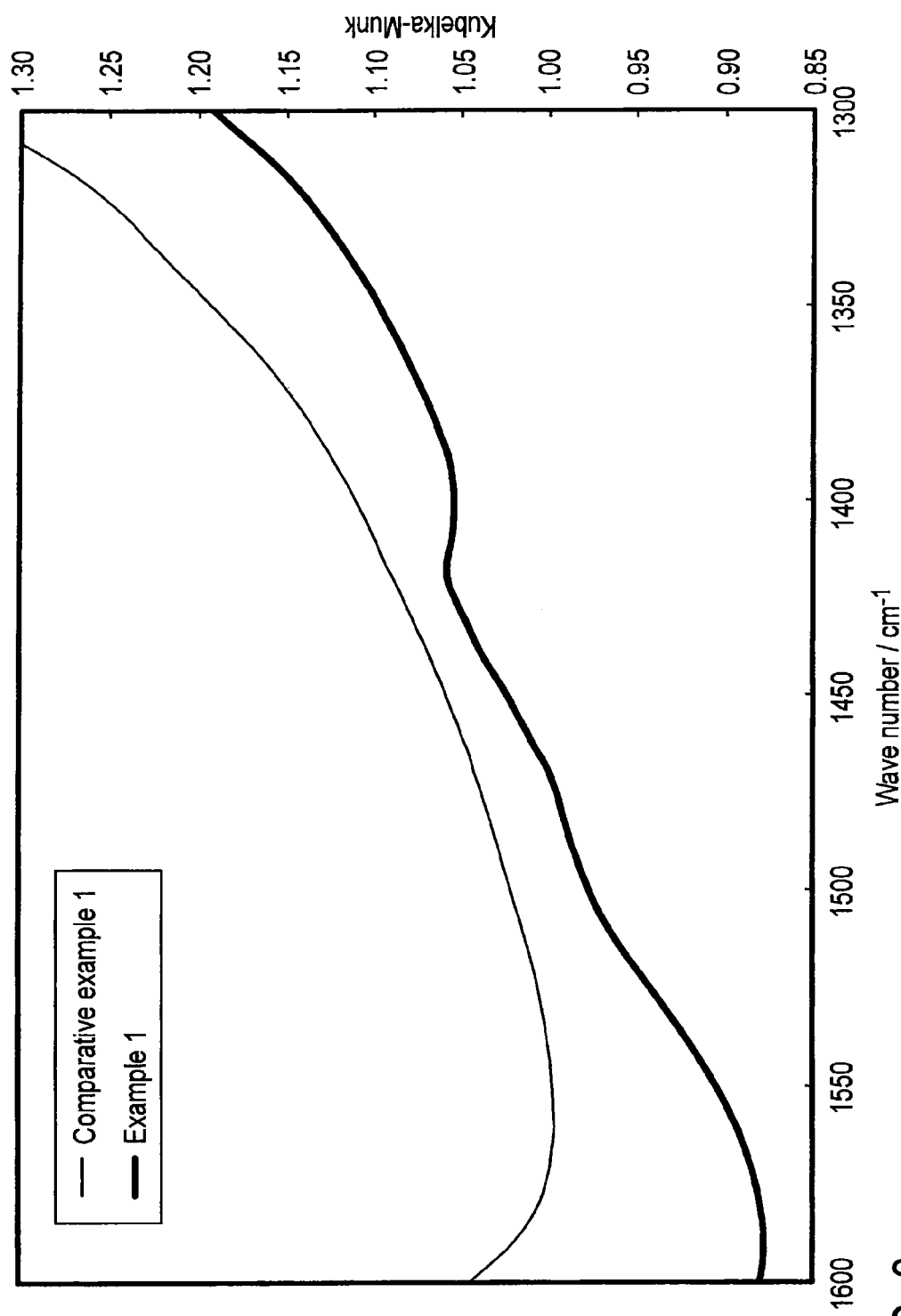
FIG. 8 is an infrared diffuse reflectance spectrum (1300 to 1600 $cm^{-1}$) of the niobium composite oxide ($TiNb_2O_7$) in Example 1 and Comparative example 1.
Figure 9:
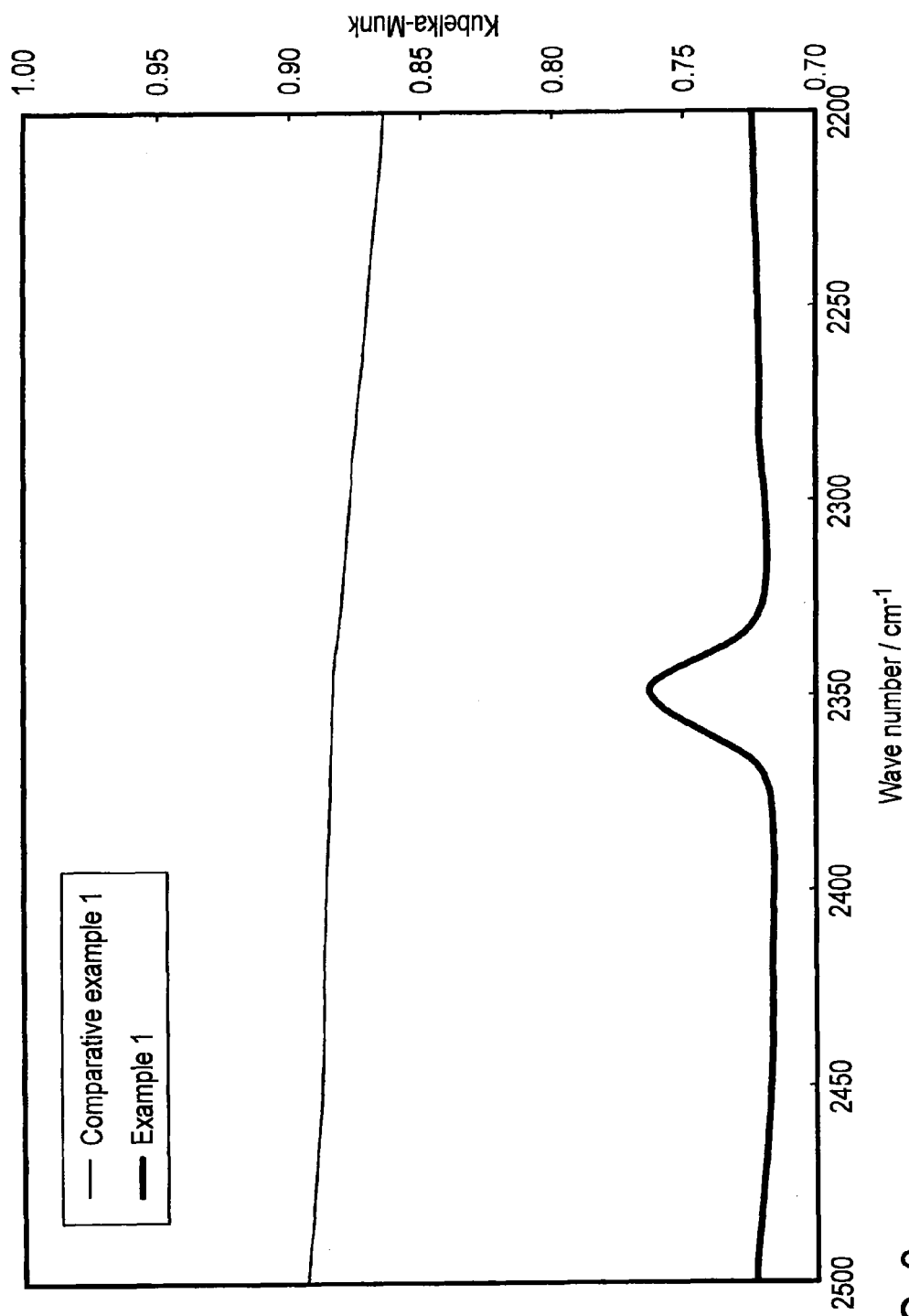
FIG. 9 is an infrared diffuse reflectance spectrum (2200 to 2500 $cm^{-1}$) of the niobium composite oxide ($TiNb_2O_7$) in Example 1 and Comparative example 1.

FIGS. 8 and 9 show the results obtained by performing the infrared diffuse reflectance measurement at 30° C. on each active material obtained in Example 1 and Comparative example 1. FIG. 8 shows an infrared diffuse reflectance spectrum at 1300 to 1600 $cm^{-1}$, and FIG. 9 shows an infrared diffuse reflectance spectrum at 2200 to 2500 $cm^{-1}$. According to the results, in Example 1, absorption peaks around at 1430, 1500, and 2350 $cm^{-1}$, which were considered to be originated from carbonate ions (mainly lithium carbonate), were observed. The peaks were not confirmed in Comparative example 1.

The presence or absence of the peaks at about 1430 $cm^{-1}$ and 1500 $cm^{-1}$ in all the examples is shown in Table 1 below.

(Measurement of Battery Performances)

The beaker cells produced in Examples 1 to 11 and Comparative examples 1 to 6 were subjected to a constant current charge/discharge cycle of performing charging at 1 C and discharging at 1 V (at 25° C. for 3 hours) (lithium insertion). Thereafter, a charge/discharge cycle of performing charging at 1 C (lithium discharge) up to 3 V was repeated 100 times. The ratio of the discharge capacity after 100th cycle to the initial capacity was calculated as the capacity-maintenance ratio (%). The results are shown in Table 1. The actual capacity of each beaker cell is described further in Table 1.

TABLE 1

| | Negative electrode active material | pH | Peaks at 1430, 1500, and 2350 $cm^{-1}$ | Carbon content (% by mass) | Capacity-maintenance ratio (%) | Actual capacity after 100 cycles (mAh/g) |
|---|---|---|---|---|---|---|
| Comparative Example 1 | Sample A1 | 6.9 | Not detectable (ND) | ND | 20 or less | 52 |
| Example 1 | Sample B1 | 8.7 | Detected | 0.12 | 88 | 238 |
| Example 2 | Sample C1 | 7.4 | Not detectable (ND) | 0.01 | 64 | 172 |
| Example 3 | Sample D1 | 7.6 | Not detectable (ND) | 0.02 | 80 | 216 |
| Example 4 | Sample E1 | 7.8 | Detected | 0.03 | 86 | 232 |
| Example 5 | Sample F1 | 9.6 | Detected | 0.20 | 90 | 243 |
| Example 6 | Sample G1 | 10.9 | Detected | 0.41 | 90 | 243 |
| Example 7 | Sample H1 | 12.5 | Detected | 1.03 | 88 | 237 |
| Comparative Example 2 | Sample I1 | 13.2 | Detected | 3.02 | 60 (Generation of gas) | 162 |
| Example 8 | Sample J1 | 8.5 | Not detectable (ND) | 0.13 | 86 | 231 |
| Comparative Example 3 | Sample A2 | 6.9 | Not detectable (ND) | ND | 20 or less | 49 |
| Example 9 | Sample B2 | 8.6 | Detected | 0.12 | 86 | 224 |
| Comparative Example 4 | Sample A3 | 7.0 | Not detectable (ND) | ND | 20 or less | 43 |
| Example 10 | Sample B3 | 9.0 | Detected | 0.13 | 94 | 249 |
| Comparative Example 5 | Sample A4 | 7.1 | Not detectable (ND) | ND | 20 or less | 38 |
| Example 11 | Sample B4 | 9.8 | Detected | 0.19 | 84 | 210 |
| Comparative Example 6 | Sample A5 | 11.0 | Detected | 0.54 | 98 | 161 |
| Comparative Example 7 | Sample B5 | 12.2 | Detected | 0.62 | 93 | 153 |

(Infrared Diffuse Reflectance Measurement after Absorption of Pyridine)

Infrared diffuse reflectance measurement after absorption of pyridine was performed on each active material obtained in Example 1 and Comparative example 1. States of the Bronsted (B) acid site and the Lewis (L) acid site on the sample surface can be examined by the measurement. An apparatus and procedures for the measurement are as follows:

<Diffuse Reflection Measurement Apparatus>
Fourier-transformed type FTIR apparatus: Varian 7000 (manufactured by Varian, Inc.)
Light source: Special ceramic material
Detector: DTGS
Wavenumber resolving power: 4 $cm^{-1}$
Integration times: 128 or more
Attached device: diffuse reflection measuring device (manufactured by PIKE Technologies Co.)
Reference: gold deposited film
<Measurement Procedure>

[1] A sample powder was directly set in the apparatus to heat up to 150° C. while flowing $N_2$ at 50 ml/min and then it was maintained at 150° C. for 30 minutes or more.

[2] The temperature of the powder was returned to near the room temperature and the powder was heated to 100° C. again.

[3] The pressure of a cell was reduced with an oil diffusion pump, pyridine vapor was introduced into the cell, and the adsorption process was performed for 15 minutes or more.

[4] The sample powder was heated at 100° C. for 30 minutes or more while flowing $N_2$ at 100 ml/min and then it was further heated at 150° C. by maintaining for 30 minutes or more. The physically adsorbed or hydrogen bonded pyridine (HPY) was eliminated, and the in-situ infrared spectrum measurement was performed.

Figure 10:
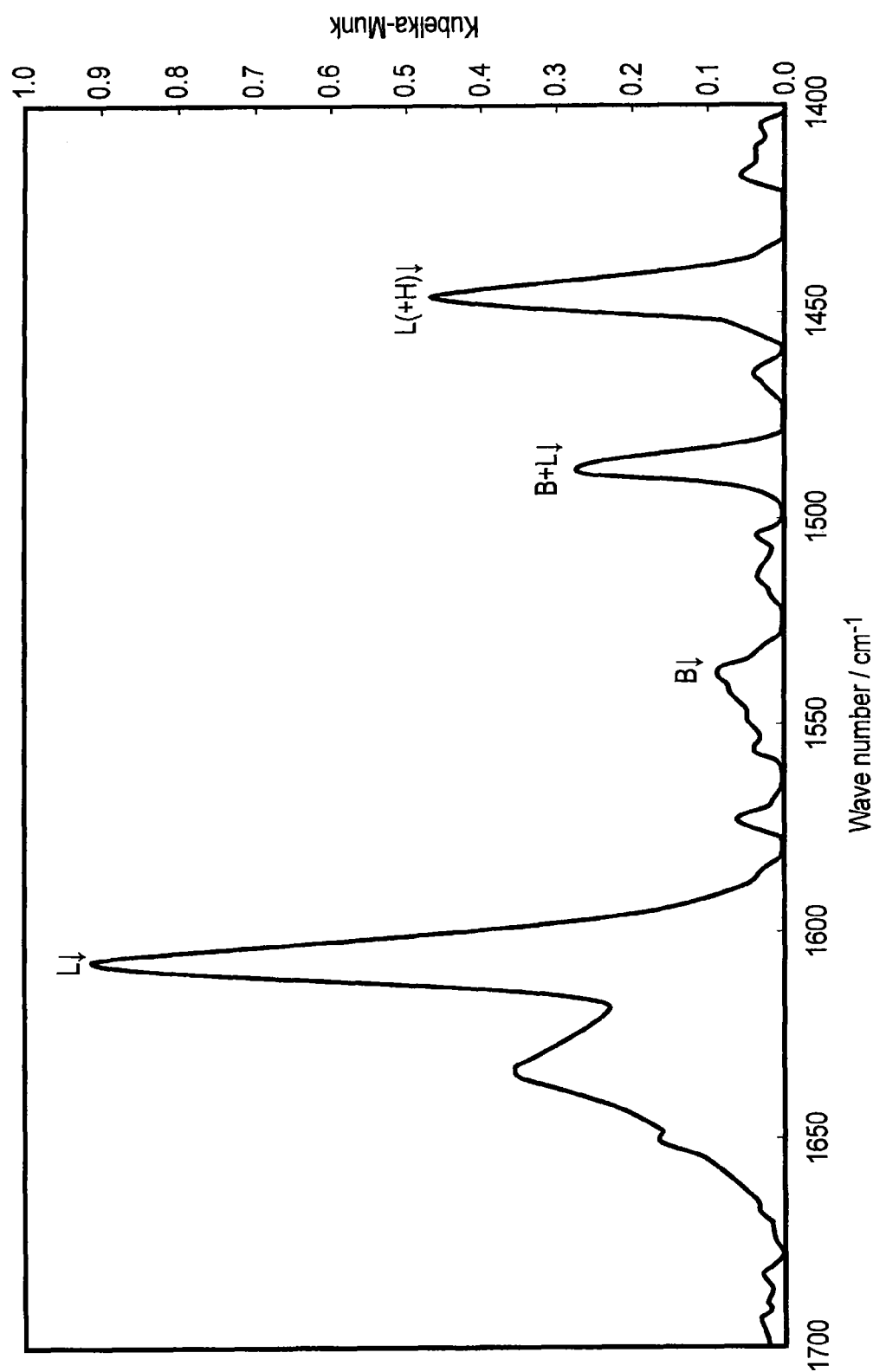
FIG. 10 is an infrared diffuse reflectance spectrum after absorption of pyridine in the niobium composite oxide ($TiNb_2O_7$) in Comparative example 1.

FIG. 10 shows infrared diffuse reflectance measurement results after adsorption of pyridine in Comparative example 1. In the drawing, the peak related to the pyridine (BPY) bonded to the Bronsted (B) acid site was designated as "B", the peak related to the pyridine (LPY) bounded the Lewis (L) acid site was designated as "L", and the peak related to the hydrogen bonded pyridine (HPY) was designated as "H".

In Example 1 and Comparative example 1, values of absorption peak areas around at 1145, 1538, and 1607 $cm^{-1}$, originated from the pyridine attached to the acid site of each of the samples (referred to as S1445, S1538, and S1607) are shown in Table 2. As for S1445 and S1538, a baseline was drawn based on each absorption peak originated from the pyridine and the area of the surrounded portion was determined. As for S1607, the peak was split using the Gaussian function (five in the case of Comparative example 1) and calculated.

TABLE 2

| | Area of absorption peak of pyridine attached to acid site | | |
|---|---|---|---|
| | S1445 | S1538 | S1607 |
| Comparative Example 1 | 4.49 | 1.65 | 8.90 |
| Example 1 | 1.15 | ND | ND |

According to Table 2, the B acid site and the L acid site showed high values in Comparative example 1. It was found that the solid acid site concentration was high. On the other hand, in Example 1, the value of the B acid site was lower than the minimum limit of detection. It was found that the value of the L acid site was greatly smaller than that of Comparative example 1. Regarding the result of S1445 in Example, there are contributions of the pyridine bonded to the L acid site (L) and the hydrogen bonded pyridine (H). Since the absorption peak around at S1607 $cm^{-1}$ is hardly observed, the L acid site concentration is considered to be lower than the minimum limit of detection.

The batteries of Example 1 and Comparative example 1 after the test were disassembled (lithium release state) and negative electrodes were taken out. The electrodes were sufficiently washed with methylethyl carbonate, followed by IR measurement of the electrode surface. In the IR spectrum of the negative electrode extracted from the battery of Example 1, the peak of carbonate ion was clearly confirmed at 2350 $cm^{-1}$. On the other hand, in the IR spectrum of the negative electrode extracted from the battery of Comparative example 1, no peak was confirmed.

The extracted negative electrode was subjected to ultrasonic cleaning, only the negative electrode active material was extracted by centrifugation, the negative electrode active material was heat-treated at 300° C., and the carbon content in the active material was measured by the infrared absorption method. As a result, the carbon content of the active material extracted from Example 1 was 0.12% by mass, while the carbon content of the active material extracted from Comparative example 1 was the measurement lower limit or less.

As is clear from Table 1, in the niobium composite oxide represented by the formula: $Li_xM_{(1-y)}Nb_yNb_2O_{(7+\delta)}$, the capacity-maintenance ratio (in the charge/discharge cycle test) of the batteries of Examples 1 to 11 was higher than that of the batteries of Comparative examples 1 and 3 to 5. This showed that the side reaction was suppressed by controlling the pH of the niobium composite oxide represented by the formula: $Li_xM_{(1-y)}Nb_yNb_2O_{(7+\delta)}$. In Comparative example 2, gas generation was significant during the evaluation, and thus stable evaluation could not be performed. This is because the amount of lithium carbonate of the sample I1 used in Comparative example 2 was large, and carbon dioxide gas was generated by a reaction with free acid in an electrolyte solution. As shown in Table 1, in Comparative examples 6 and 7 in which the spinel type titanium composite oxide was used, a sufficient actual capacity was not obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material for a battery comprising: a niobium composite oxide represented by the formula $Li_xM_{(1-y)}Nb_yNb_2O_{(7+\delta)}$,
   wherein M represents at least one kind selected from the group consisting of Ti and Zr,
   x, y, and δ are numbers respectively satisfying the following: $0 \leq x \leq 6$, $0 \leq y \leq 1$, and $-1 \leq \delta \leq 1$, and
   the pH of the active material for a battery is from 7.4 to 12.5.

2. The active material for a battery according to claim 1, wherein carbonate ions are arranged on at least one part of the surface of the active material for a battery.

3. The active material for a battery according to claim 1, wherein lithium carbonate is arranged on at least one part of the surface of the active material for a battery.

4. The active material for a battery according to claim 1, wherein the pH is a pH measured when the specific surface area of the active material for a battery is from 0.5 to 50 m$^2$/g.

5. The active material for a battery according to claim 1, wherein the pH is a pH measured when the specific surface area of the active material for a battery is from 3 to 30 m$^2$/g.

6. The active material for a battery according to claim 1, wherein a crystal structure of the niobium composite oxide belongs to a monoclinic system.

7. The active material for a battery according to claim 1, wherein the crystal structure of the niobium composite oxide belongs to a space group C/2m or P12/m1.

8. The active material for a battery according to claim 1, wherein the carbon content of the active material for a battery is from 0.01 to 3% by mass based on the total amount of the active material for a battery.

9. The active material for a battery according to claim 1, wherein the active material for a battery has a peak belonging to the carbonate ion ($CO_3^-$) in the range of 1430±30, the range of 1500±30, or the range of 2350±30 cm$^{-1}$ in an infrared reflectance spectrum with Fourier transform infrared spectrophotometer (FT-IR).

10. A nonaqueous electrolyte battery comprising:
a positive electrode;
a negative electrode comprising the active material for a battery according to claim 1; and
a nonaqueous electrolyte.

11. A battery pack comprising one or more nonaqueous electrolyte batteries according to claim 10.

12. The battery pack according to claim 11, wherein the plurality of nonaqueous electrolyte batteries are connected electrically to each other, and the battery pack further comprises a protective circuit that can detect the voltage of each of the nonaqueous electrolyte batteries.

* * * * *